Aug. 27, 1957 W. H. WALL 2,804,103
BOTTLE CAP AND MEASURING DEVICE
Filed April 8, 1955 2 Sheets-Sheet 1
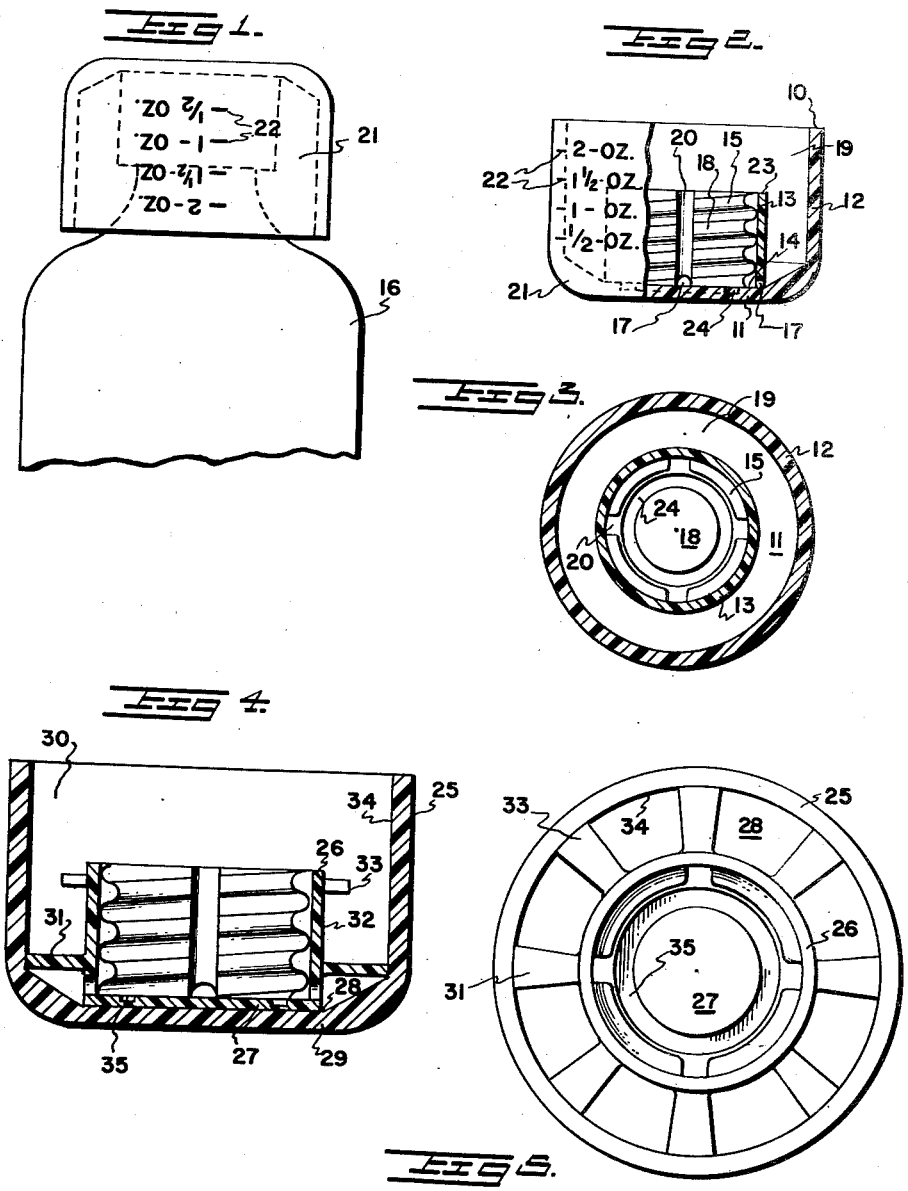
INVENTOR
WILLIAM H. WALL
BY Mead, Browne, Schuyler & Beveridge
ATTORNEY Aug. 27, 1957 W. H. WALL 2,804,103
BOTTLE CAP AND MEASURING DEVICE
Filed April 8, 1955 2 Sheets-Sheet 2
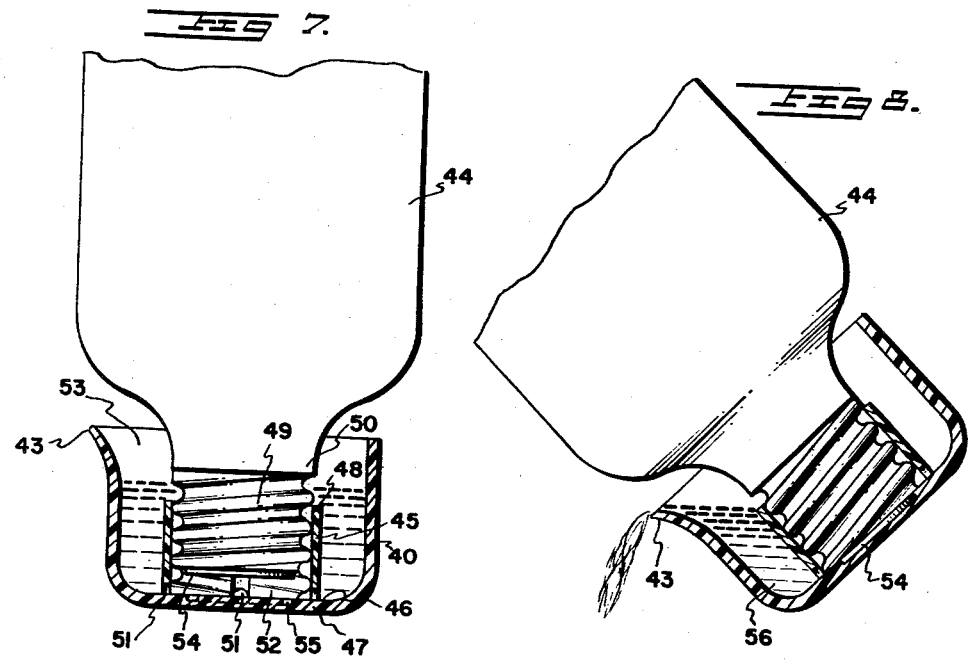
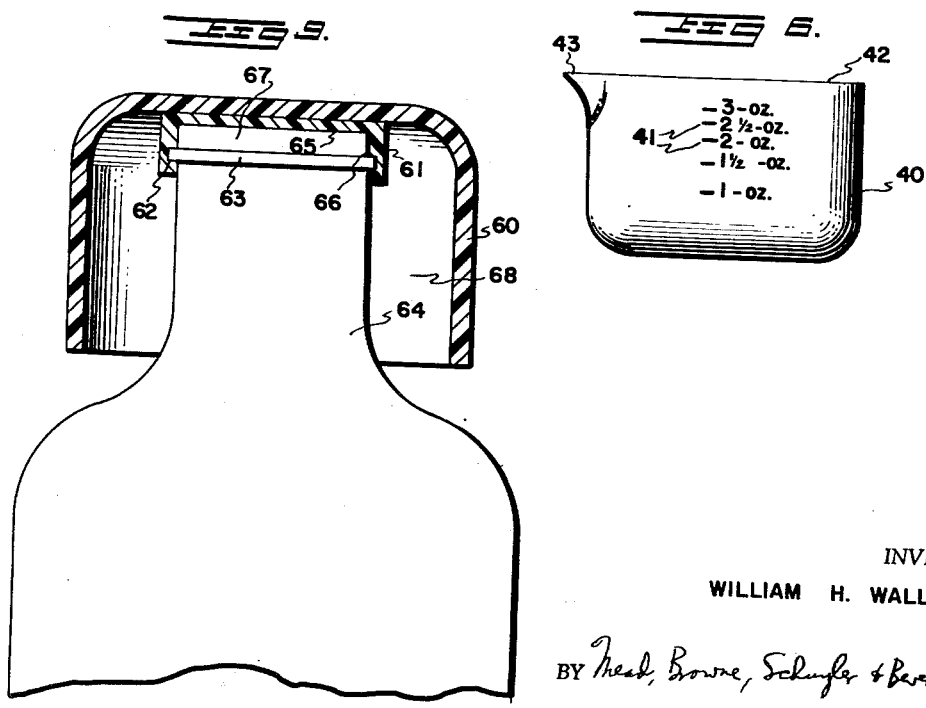
INVENTOR
WILLIAM H. WALL
BY *Mead, Browne, Schuyler & Beveridge*
ATTORNEY

United States Patent Office 2,804,103
Patented Aug. 27, 1957

2,804,103

BOTTLE CAP AND MEASURING DEVICE

William H. Wall, Durham, N. C.

Application April 8, 1955, Serial No. 500,233

7 Claims. (Cl. 141—381)

This invention relates to a bottle cap and measuring device, and more particularly, to a unitary structure adapted to be secured about the orifice, rim and neck of a bottle and having the combined functions of a bottle cap and measuring utensil.

There are numerous liquid products such as bleaches, oils, extracts of vanilla and lemon, etc. on the market which are manufactured and sold in bottles, containers, jugs, and other vessels, and which are to be used by the consumer in certain definite amounts. This necessitates first the measuring of the desired amount by means of a teaspoon, tablespoon, measuring cup, and the like, and second, the placing of the measured liquid in another receptacle where it is mixed with water, or other ingredients.

Other liquid products are sold in concentrated form, such as mouthwashes or gargles, douche liquids or powders, medicines, drugs and the like. The labels on these containers usually state that a certain amount of the product should be diluted with a definite amount of water or other liquids before it may be used. This of course necessitates the use of a measuring device such as a spoon or measuring cup, which device has to be cleaned immediately after use. In some instances, it is necessary to have a special spoon or the like available to be used with the particular material and only with that material. While a small bottle of medicine may be easily carried in a purse or pocket, to be used when necessary, it is inconvenient to also carry a spoon or measuring cup so as to measure out a certain predetermined quantity of medicine to be taken by the user. What frequently happens is that a person attempts to pour the estimated amount of medicine into a glass directly from the bottle. This usually means that the person is taking too much or else is not taking enough and he can never be sure that he has taken the right amount.

It is a principal object of this invention to provide a bottle cap and measuring device which is secured about the orifice, rim and neck of a bottle so as to insure the immediate availability of a measuring utensil when using the contents of the bottle.

Another object of this invention is to provide a combined bottle cap and measuring device which is simple in construction, inexpensive to manufacture, and efficient in operation and service.

A further object of this invention is to provide a combined bottle cap and measuring device which may also be used as a drinking receptacle.

In obtaining the objects of this invention, one feature resides in having a bottle cap disposed within and secured to a measuring utensil, which utensil has appropriate marks on its side surface to indicate the quantity of material therein.

Another feature resides in having a passageway between the interior of the bottle cap and the interior of the measuring utensil so that the measured amount of liquid is retained in both the cap and utensil compartments and flows easily from the bottle cap compartment in to the measuring device compartment.

Still another feature of this device is to have one or more vertical channels or grooves on the interior surface of the bottle cap so as to permit the fluid within said bottle cap to flow more easily therefrom into the measuring device.

Other objects, features and advantages of this invention will become apparent from the following description taken in conjunction with the drawing wherein:

Fig. 1 is a fragmentary side view of a bottle showing a side view of an embodiment of the invention in place thereon.

Fig. 2 is a partial sectional view of the invention.

Fig. 3 is a plan view of the invention looking into the interior.

Fig. 4 is a sectional view of another embodiment of the invention.

Fig. 5 is a plan view of the embodiment of the invention of Fig. 4 looking into its interior.

Fig. 6 is a side view of another embodiment of the invention.

Fig. 7 is a fragmentary side view of a bottle showing a sectional view of the embodiment of the invention of Fig. 6 shown thereon.

Fig. 8 is a sectional view of the embodiment of Fig. 6 showing the removal of the liquid contents from the measuring device.

Fig. 9 is a fragmentary side view of a bottle showing a sectional view of still another modification of the invention thereon.

As best seen in Fig. 2 a measuring device or container 10 consisting of a base 11 and a sidewall 12 integral therewith along its periphery has a cylindrical portion 13 secured to the upper surface 14 of the base 11 and extending vertically therefrom. The inner surface of the cylindrical member 13 has a plurality of threads 15 adapted to engage corresponding threads on the neck of a bottle 16 and be secured thereto. Located at spaced intervals at the juncture of the cylindrical member 13 with the upper surface 14 of the base 11 are a plurality of perforations or openings 17 which permit the flow of liquid from inner chamber or compartment 18 to the outer chamber or compartment 19 and vice versa. Leading from each of said openings 17 and extending upwardly the height of the cylindrical member 13 are a plurality of grooves or channels 20. The exterior surface 21 of the measuring utensil 10 has a series of marks or graduations 22 disposed at appropriate intervals thereon.

For use, the bottle cap and measuring device 10 is unscrewed from the bottle 16 and held in the position illustrated in Fig. 2 of the drawing. The liquid from the bottle 16 is poured into the measuring utensil 10 and immediately enters both of the chambers 18 and 19 formed by the cylindrical member 13 and the sidewall 12 respectively. Since both of the chambers 18, 19 are open to each other by means of the passages 17, the liquid in the utensil 10 will, of course, seek its own level if it is below that of the rim 23 of the cylindrical member 13. When the liquid is to be poured out, it will necessarily flow from the outer compartment 19 and the liquid within the inner compartment 18 will pass into compartment 19 by means of the openings 17 and when the device 10 is tipped to a sufficient degree, liquid will also flow out along the grooves or channels 20 and into compartment 19. The presence of channels 20 is of particular importace particularly if the liquid has a thick consistency, since it can flow along the grooves instead of flowing over each of the several threads disposed within the inner surface of the cylindrical member 13. This assures greater accuracy since the entire contents of the chambers 18, 19 can be poured out of the device into another receptacle. To insure a tight fit between the rim of the bottle 16 and the upper surface 14 of the base 11 defined within the cylindrical member 13 when the bottle is capped, a circular recess 24, conforming in size to the rim of the bottle, is formed within the base 11 so that the rim of the bottle may be received therein.

In the preferred embodiment of the invention the measuring device is formed of either a transparent or translucent material, such as Celluloid, polyethylene, glass, and the like. This permits the user of the device to see the height of the liquid within the measuring device 10 and to measure the amount by means of the marks or graduations 22 on the outer surface 21 of the device. It is appreciated that the device of this invention need not be made of either a transparent or translucent material, in which instance the graduations 22 are placed along the inner surface of sidewall 12 so that a person may see the height to which the liquid is poured by looking into the interior of the measuring device 10.

While it is contemplated to manufacture the bottle cap and measuring device of this invention by molding or casting it in a unitary structure, it is understood that the measuring device 10 and cylindrical member 13 may be made separately and the latter then secured to the upper surface 14 of the base 11 of the former in any desirable manner.

In the embodiment of the invention shown in Figs. 4 and 5, the basic features of the measuring device 25 and the cylindrical portion 26 are similar to those just described. However, the cylindrical member 26 may have a base portion 27 secured thereto along its bottom edge, which base portion 27 is in turn secured to or in engagement with the upper surface 28 of base portion 29 of the measuring device 25. The threaded cylindrical member 26 is held in place within the compartment 30 of the measuring device 25 by a plurality of arms 31 extending laterally from and integral with the outer surface 32 of the cylindrical member 26. The ends 33 of the arms 31 are in frictional engagement with the inner wall surface 34 of the measuring device 25. In this embodiment, the measuring device 25 and the bottle cap 26 may be made separately and the latter then inserted within the former to a position similar to that illustrated in Fig. 4 of the drawing. The base 27 of the bottle cap 26 has a circular recess 35 disposed therein for receiving the rim of the neck of a bottle.

Another embodiment of the invention is disclosed in Figs. 6 to 8, inclusive, of drawing. Here a measuring device 40, preferably made of either transparent or translucent material, has a plurality of graduations 41 on the exterior surface thereof. At one edge of the rim 42 of the measuring device 40 is located a pouring spout 43 to facilitate the pouring of the contents of the measuring device into an appropriate receptacle. The measuring device 40 is adapted for use in conjunction with the bottle 44 as illustrated in Fig. 7. The measuring device 40 has a cylindrical member 45 vertically supported and attached to the upper surface 46 of the base 47 of the measuring device 40. The inner surface 48 of the cylindrical member 45 is threaded so that it may engage the threads 49 on the neck of the bottle 44. Located at the bottom portion of the cylindrical member 45 at the juncture of the member with the upper surface 46 of the base 47 are a plurality of openings 51 which permit the passage of liquid from the inner compartment 52 formed by the cylindrical member 45 and the base 47 to the outer compartment 53 of the measuring utensil.

As stated above, the modified form of the invention illustrated in Fig. 7 is to be used in conjunction with the bottle. The graduations 41 appearing on the outer surface of the measuring device 40 are calibrated so as to indicate the quantity of liquid present in the outer container 53 only. A user desiring two ounces of liquid would invert the bottle in the manner shown in Fig. 7 and would then unscrew the bottle cap and measuring device slightly until the rim 54 of the bottle was raised from its position within the recess 55 in the base 47 and was positioned slightly above the openings 51 in the lower portion of the cylindrical member 45. As liquid tends to seek its own level, the contents of the bottle will be forced outwardly through the openings 51 and into the chamber 53 of the measuring device 40. When the liquid rises in the chamber 53 and approaches the desired graduation indicated on the exterior surface of the device 40, the bottle cap and measuring device is rotated toward a closing position. As the liquid level reaches the desired two ounce graduation, the bottle cap and measuring device is quickly rotated until the rim 54 of the bottle enters the recess 55 in the base of the measuring device and prevents further flow of liquid from the bottle to the outer chamber 53. To remove the measured quantity of liquid from the outer chamber 53 the bottle and cap fastened thereto is tilted in the manner shown in Fig. 8 so that the liquid 56 flows from the container 40 from spout 43. It will be readily appreciated that the rate of rise of liquid in the outer chamber 53 depends on the size of the openings 51, which size in turn depends upon the position of the rim of the bottle 44 with respect to the openings 51 and recess 55.

While the various embodiments of the invention thus far disclosed have pertained to bottle caps and measuring devices wherein the inner surface of the bottle cap or cylindrical member is threaded, it is anticipated that a snap-on type of bottle cap, such as the one illustrated in Fig. 9 may be used. The measuring device 60 (Fig. 9) has a cylindrical member 61 disposed therein with the inner surface of the cylindrical member 61 being formed with a groove 62 adapted to snap on to and engage a flange 63 located on the neck of the bottle 64 near its rim 65. Of course, the inner surface 66 of the cylindrical member 61 has provided therein openings and vertical grooves or channels (not shown) which will permit the passage of the fluid of any consistency from the chamber 67 formed by the cylindrical member 61 to the chamber 68 of the measuring device 60 in the manner previously described for the other embodiments of this invention.

It is to be understood that various changes, modifications and departures from the specific disclosure may be made by those skilled in the art within the scope and spirit of the invention as defined in the appended claims.

Having fully described the invention, what is claimed is:

1. A measuring device comprising a base, a sidewall integral with and extending upwardly from the peripheral edge of said base, a cylindrical member having one end thereof secured to said base and extending upwardly therefrom, said cylindrical member having an opening therethrough at the juncture of said cylindrical member and said base, said cylindrical member having a groove on its inner surface extending upwardly from said opening to the other end of said member, and means on said cylindrical member for securing said member about the orifice rim and neck of a bottle.

2. A measuring device adapted to be secured about the orifice rim and neck of a bottle, comprising a base, a sidewall integral with and extending upwardly from the peripheral edge of said base, a cylindrical member having one end thereof secured to said base and extending upwardly therefrom, said cylindrical member having an opening therethrough, said cylindrical member having a groove extending upwardly from said opening to the other end of said member, a portion of said base lying within said cylindrical member having an annular recess therein, and means on said cylindrical member for securing said member about the orifice, rim and neck of a bottle, said recess being adapted to receive said rim of said bottle.

3. A measuring device adapted to be secured about the orifice rim and neck of a bottle comprising, a base, a sidewall integral with and extending upwardly from the peripheral edge of said base, said base and said sidewall being formed of transparent material, a graduated scale located on the outer surface of said sidewall, a cylindrical member having one end thereof secured to said base and extending upwardly therefrom, said cylindrical member having an opening therethrough at the juncture of said member with said base, said member having a groove extending upwardly along its inner surface from said opening to the other end of said member, said base disposed within said cylindrical member having a recess therein, and means on said cylindrical member for securing said member about the orifice, rim and neck of a bottle, said recess adapted to receive said rim of said bottle.

4. A measuring device comprising a first container, a second container disposed within said first container, said second container having an opening therethrough, said second container having a groove extending upwardly from said opening to the rim thereof, and means for securing said second container in fixed relation to and within said first container, said second container having means for securing it about the orifice, rim and neck of a bottle.

5. A measuring device comprising a first container, a second container disposed within said first container, said second container comprising a base and a sidewall integral with and extending upwardly from the peripheral edge of said base, said sidewall having an opening therethrough, said sidewall having a groove on its inner surface extending from said opening to the rim thereof and means for securing said second container in fixed relation to and within said first container, said second container having an annular recess within said base, said second container having means for securing said container about the orifice, rim and neck of a bottle whereby said annular recess is adapted to receive said rim of said bottle.

6. A measuring device comprising a first container, a second container disposed within said first container, said second container having an opening therethrough, said second container having a plurality of arms integral with and extending laterally from the outer surface thereof, the ends of each of said arms being in frictional engagement with the inner surface of said first container, and said second container having means for securing said container about the orifice, rim and neck of a bottle.

7. A measuring device comprising a first container, a second container disposed within said first container, said second container having an opening therethrough, said second container having a groove extending upwardly from said opening to the rim thereof, said second container having a plurality of arms integral with and extending laterally from the outer surface thereof, the ends of said arms being in frictional engagement with the inner surface of said first container, and said second container having means for securing said container about the orifice, rim and neck of a bottle.

References Cited in the file of this patent

UNITED STATES PATENTS

| | | |
|---|---|---|
| 1,869,712 | Palmer | Aug. 2, 1932 |
| 1,986,741 | Moser | Jan. 1, 1935 |

FOREIGN PATENTS

| | | |
|---|---|---|
| 9.312 | Great Britain | Apr. 18, 1910 |